United States Patent
Menzel et al.

(10) Patent No.: US 11,049,301 B2
(45) Date of Patent: Jun. 29, 2021

(54) METHOD AND SYSTEM FOR AUTOMATICALLY GENERATING AN APPEALING VISUAL BASED ON AN ORIGINAL VISUAL CAPTURED BY THE VEHICLE MOUNTED CAMERA

(71) Applicant: HONDA RESEARCH INSTITUTE EUROPE GMBH, Offenbach/Main (DE)

(72) Inventors: Stefan Menzel, Offenbach (DE); Bernhard Sendhoff, Offenbach (DE); Thomas Weißwange, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 182 days.

(21) Appl. No.: 16/422,139

(22) Filed: May 24, 2019

(65) Prior Publication Data
US 2019/0362527 A1   Nov. 28, 2019

(30) Foreign Application Priority Data

May 24, 2018   (EP) .................................... 18173982
May 22, 2019   (EP) .................................... 19175877

(51) Int. Cl.
*G06K 9/00* (2006.01)
*G06T 11/60* (2006.01)
(Continued)

(52) U.S. Cl.
CPC .............. *G06T 11/60* (2013.01); *G06K 9/726* (2013.01); *G06T 5/006* (2013.01); *G06T 5/007* (2013.01); *H04N 5/2253* (2013.01)

(58) Field of Classification Search
None
See application file for complete search history.

(56) References Cited

U.S. PATENT DOCUMENTS

2009/0169052 A1* 7/2009 Seki .......................... G06T 7/74
                                                                        382/103
2014/0104424 A1   4/2014 Zhang et al.
(Continued)

FOREIGN PATENT DOCUMENTS

EP   1 975 673 A2   10/2008
EP   2 410 740 A1   1/2012

OTHER PUBLICATIONS

European Search Report dated Mar. 25, 2019 corresponding to European Patent Application No. 18173982.2.
(Continued)

*Primary Examiner* — Atiba O Fitzpatrick
(74) *Attorney, Agent, or Firm* — Squire Patton Boggs (US) LLP (57) ABSTRACT

A system and method for automatically generating an appealing visual based on an original visual captured by a vehicle mounted camera are provided. A semantic image content and its arrangement in the original visual is computed; an optimization process is performed that improves an appeal of the original visual by making it more similar to a set of predetermined traits. The optimization process may include adding information to the original visual to generate an enhanced visual by adapting content from further visuals, and adapting iteratively a geometric parameter set of the enhanced visual to generate a certain perspective or morphing to improve an arrangement of semantics in the enhanced visual. The optimized parameter set may be applied to the enhanced visual. Post-processing may be conducted after applying the optimized parameter set using a set of templates to generate a final visual that may be output for immediate or later use.

21 Claims, 2 Drawing Sheets

(51) Int. Cl.
    *G06K 9/72*     (2006.01)
    *G06T 5/00*     (2006.01)
    *H04N 5/225*     (2006.01)

(56) References Cited

U.S. PATENT DOCUMENTS

| | | |
|---|---|---|
| 2016/0044284 A1 | 2/2016 | Goseberg et al. |
| 2016/0311374 A1 | 10/2016 | May |
| 2019/0049724 A1* | 2/2019 | Kimura .............. G06K 9/00671 |

OTHER PUBLICATIONS

Alexey Medvedev et al., "Citywatcher: Annotating and Searching Video Data Streams for Smart Cities Applications," In: "Serious Games," Jan. 2014, XP055527556.

* cited by examiner

METHOD AND SYSTEM FOR AUTOMATICALLY GENERATING AN APPEALING VISUAL BASED ON AN ORIGINAL VISUAL CAPTURED BY THE VEHICLE MOUNTED CAMERA

BACKGROUND

Field

The invention regards a method and a corresponding system which is capable of automatically generating an appealing visual by improving an original visual that was captured by a vehicle mounted camera. The invention particularly uses cameras that are mounted on vehicles and intended for capturing images on the environment in order to analyze traffic situations in assistance systems.

Description of the Related Art

With the increasing research and development of autonomous driving more and more vehicles on the roads are equipped with devices, which allow image and video recordings. The typical purpose of these images and videos is to be processed for advanced vehicle safety or advanced driving capabilities. It is evident that this purpose does not require high quality of the images taken as long as the information included in the image is sufficient for situation analysis. It is sufficient that the information included in the image can be analyzed with high accuracy so that, for example, prediction results are reliable. Appearance of an image captured by such camera on the other side is not relevant at all. Further, any car manufacturer needs to keep an eye on the costs of vehicle mounted systems. Thus, cheap cameras are included in assistance driver systems. Furthermore, there is a high competition between car manufacturers. As a result, every car manufacturer has to keep an eye on the costs arising from developing new systems. In particular, the additional costs caused by modern assistance systems must be kept under control, which results in cheap hardware used for such assistant systems.

Although a plurality of algorithms and methods are known in the art to improve an image that has been taken by a camera, there is no automatic routine known, which starts from an image captured by a vehicle mounted camera in order to achieve a final appealing visual (still image or video) that has satisfying quality and might be published. On the other side, there is a tremendous amount of images captured by vehicle mounted cameras and therefore many situations are documented by these cameras. Snapshots of situations are generated which might be interesting for the car owner but the quality is so low that there is no interest in using these images for publication or any other use apart from analyzing a traffic situation by an assistance system. Thus, there is a need to improve the quality of these images so that more expensive hardware is unnecessary, nevertheless leading to an appealing visual. This has even the advantage that images can be captured and recorded while the vehicle driver is moving. In particular for landscape photography this is a great improvement regarding convenience for a user.

SUMMARY

This object is achieved by the present invention according to the method claims and the system claims.

Advantageous aspects and features are defined in the dependent claims.

According to the present invention, a system and method for automatically generating an appealing visual based on an original visual captured by a vehicle-mounted camera is provided. According to the invention at first an original visual is captured and recorded by the vehicle mounted camera. This original image is captured with a quality that is limited by the camera, which is mounted on the vehicle but also on the current traffic situation that defines a viewing angle of the visual. The visual is captured out of the traffic situation, which is encountered by the vehicle and its driver. Therefore, no specific settings can be made on the vehicle-mounted camera so that any image that will be taken by the camera will use the settings, which are optimized for the assistance system which relies on the visuals taken by the vehicle mounted camera. Of course, a camera specific for the purpose of generating visuals can be mounted as well on the vehicle.

It is to be noted that the term vehicle as used to define and describe the invention is not limited to road vehicles but may also comprise robotic devices. Such robotic devices could be (autonomous) lawn mowers or the like.

After such original visual was recorded in a memory of the system, processing of the original visual (image) starts in order to improve its appearance.

A semantic image content and its arrangement in the original visual may be computed before an optimization, for example, using an annotation and semantic image analysis algorithm. Arrangement of semantic image content (semantics) refers to a spatial arrangement of semantic content in the original visual. This may include characteristics and features concerning a composition of the original visual.

An optimization process is performed that improves an appeal of the original visual by making it more similar to a set of predetermined traits by executing the steps: adding information to the original visual to generate an enhanced visual by adapting content from further visuals. The further visuals are captured by other sensors or created based on information from other sensors or from a database of visuals; adapting iteratively a geometric parameter set of the enhanced visual to generate a certain perspective or morphing to improve an arrangement of semantics in the enhanced visual; applying the adapted parameter set to the enhanced visual and conducting post-processing on the enhanced visual after applying the optimized parameter set using a set of templates to generate a final visual.

The information added to the rectified visual ensures that the details and objects which are not captured by the vehicle mounted camera in the original visual are added to the visual to improve the content of the visual. The information that is added is taken from visuals captured by other sources. Such other sources may be, for example, vehicle mounted cameras of other vehicles, which captured images of the same area. The added information could also be taken from visuals that had been made on other occasions. Thus, even if the vehicle passes a specific location twice or more it might be possible that the camera that is mounted on that vehicle takes images with different content. Thus, such different content could be merged in order to achieve a single enhanced visual.

After the content of the image, or in more general words, the visual, has been enhanced, parameters of the enhanced visual are optimized according to criteria of appeal for generating an optimized parameter set. Such parameters might, for example, be a perspective of the visual but also existence of objects in the visual.

Optimizing the geometric parameters of the enhanced visual according to criteria of appeal for generating an optimized parameter set may comprise first encoding the geometric parameter set in an optimization algorithm. Then, the encoded parameter set is iteratively adapted to generate an adapted parameter set. Each adapted parameter set is applied to the enhanced visual to generate a resulting enhanced visuals. A method for automated semantic annotation is applied on the resulting enhanced visuals from applying the adapted parameter set for generating an annotation and a similarity of the generated annotation towards a set of traits is calculated.

After the optimization of the geometric parameters, the parameter set that was found to be the best, the generated optimized parameter set, can be applied to the enhanced visual in order to generate a final visual.

The final visual is output for immediate or later use.

In an embodiment of the method, a distortion that was generated by the perspective of the camera when capturing the original visual is rectified to generate a rectified visual. Additionally or alternatively, distortion that was caused directly by camera parameters is rectified to generate the rectified visual. These distortions may, for example, be the consequence of a focal length of the camera used. In many cases, a short focal length is required for a vehicle mounted camera in order to have an almost panoramic view of the environment of the vehicle which allows to gather much information on the traffic situation. Of course, on the other hand, for appealing images it might be preferred to have an enlarged focal length. The rectification, which is performed on the original image allows to have a basis for further processing of the image as almost neutral perspective for seamless information fusion in the form of the generated rectified visual.

After applying the parameter set that was found to be best to the enhanced visual, an embodiment further comprises a step of performing post-processing for generating the final visual. For performing the post-processing, a set of templates is used. Using such templates allows to adapt brightness, color saturation and other characteristics of an image to be improved and in particular to be adapted to user preferences.

With the inventive method and corresponding system, it is possible that in a highly automated manner and starting from a relatively low quality image an appealing image is generated which is ready for publication. Thus, based on images which are captured and recorded anyway by the vehicle driving around and encountering different traffic situations appealing images can be generated without the user being forced to apply different improvement techniques.

According to one particularly advantageous aspect, the capturing of the original visual is triggered by an event. The event could be reaching a local time, which was set in advance, occurrence of defined sensor anomalies and occurrence of audio events. If such trigger events are defined, it is a great advantage that the driver of the vehicle is not confronted with splitting his concentration on driving but also on identifying a situation where he wants to capture an image. Thus, he can, for example, identify in advance a situation where he wants to take a picture. A local time as trigger event could be used in order to take a photograph during sunset without considering the current location of the vehicle. On the other hand, occurrence of defined sensor anomalies could be used to take a video in case of strong acceleration or the like. Audio events might be spoken words by a human or radio voice in the vehicle, or even external audio events like sounds of the traffic infrastructure or other traffic participants.

Alternatively, the visuals are captured and recorded continuously. The captured and recorded visuals are each provided with a semantic annotation using a method for automated semantic annotation of the continuously captured and recorded visuals. The original visual used for further processing is selected based on a similarity of a semantic annotation with the set of traits. Using such a routine makes it possible to select a visual to be used as original visual for further processing even in case that the overall number of visuals that had been taken automatically by the vehicle mounted camera exceeds the number that reasonably could be searched by a user by far. This approach is specifically useful since the cameras that are mounted for use in an advanced driver assistance system usually continuously observe the environment of the vehicle and, thus, the original visual could be a single image taken out of the video recorded by the vehicle mounted camera. This even enables a later processing of the visuals, because at first all the visuals that are automatically taken are recorded in a memory which is also mounted in the system. The processing could then be deferred to a later point in time where a higher processing capability is available.

Preferred traits to a visual from a plurality of automatically recorded and continuously recorded visuals could be specific words, categories, prepositions, number of words, or similarity of words.

Advantageously, the calculation of the similarity is computed not only based on a single trait but on a sum of single traits. This allows the combination of different aspects in order to select from the entirety of available visuals the one fitting best to a defined set of criteria.

Further, after the content and geometric parameters of the visual have been improved as a result of an optimization loop, it is preferred that in a post-processing step at least lighting, brightness, color saturation, or white balance is adjusted. Of course, the plurality of these parameters could also be adjusted according to a pre-set user reference.

Further, the information that is added to the original visual is taken from at least one visual that is stored in the Internet in a database and/or a privately hosted database, advantageously. The information that is intended to be added to the original visual is computed by similarity of the at least one visual to the rectified visual component. Here, it is apparent that it is an advantage to firstly convert the original visual to a neutralized visual by correcting distortions as mentioned above. This allows to easily compare the image with other images taking into account the similarity between these images. The system is advantageously configured to communicate with a public database in the Internet or any database, which is privately hosted but accessible, in order to access image databases to find corresponding images which could provide information to be added. These databases may be established independently from the inventive system and may be databases that are used by other persons to publish their images of videos. If the system is configured to autonomously search such databases, an incredible amount of images is available for adding information to the original image.

On the other side, it could be advantageous that capturing images is triggered by capturing the original image or selecting an original image. In particular in smart cities which are currently developed, there are many cameras installed and connected to such smart city infrastructure. If this infrastructure is also triggered to capture an image, this could even involve cameras that are connected to a smart city infrastructure but which are not directly elements of the smart city infrastructure. For example, cameras mounted on vehicles which are driving through such smart city and which are connected to the smart city infrastructure could be indirectly triggered to capture an image.

The optimization of geometric parameters comprises encoding a geometric parameter set in an optimization algorithm. The parameter set is then iteratively adapted and each parameter set is applied to the enhanced visual. The application of these parameter sets results in a set of resulting enhanced visuals.

The parameter set potentially includes parameters which specify the image specifications of the enhanced visual. This includes besides height, width, and coordinates of, e.g., the upper left edge of the image also parameters utilized for changing the perspective of the image, for so-called image warps. In the present invention, warps are proposed to extend the capability for achieving optimal image quality criteria, the so-called traits. Objects in an image may in this way be aligned on specified relations. For image warps, features like, e.g., straight lines and associated vanishing points are defined and algorithms are applied to warp an initial image to a new one with adapted perspective and adapted compositions. Further controls are, e.g., planar regions, line segments, line orientation, borders, and fixed points. A realization of the image warp may be achieved by optimizing a transformation matrix based on the energy of each control term and applying the transformation on the image. In the present invention the parameters for vanishing points, line segments, orientation etc., are encoded in the geometric parameter set of the optimization algorithm.

These resulting enhanced visuals are automatically annotated by applying a method for automated semantic annotation. Based on the annotated resulting enhanced visuals then a calculation of similarity of the annotation towards a set of traits can be performed. It is in particular preferred to use an evolutionary optimization algorithm for the optimization of the geometric parameters. It is further to be noted that the geometric parameters might even include a decision on whether an object needs to be added to the original image or not.

For achieving good results, it is important to have, in the process, an accurate image annotation and semantic image analysis. Semantic image analysis targets the extraction of image description trying to match human perception. The results are, e.g., used for image retrieval by searching large image databases for maximum correspondence in the description words. A realization may utilize image segmentation algorithms to detect subregions, e.g., a multi-feature active contour segmentation for providing visual information to the system. This step is followed by a feature extraction and analysis step to learn an instance of a mathematical model, e.g., decision trees, artificial neural networks, or support vector machines among others. Such a process is applied to learn the model on large image data sets for achieving a high model accuracy and generalization capability, which is assessed on validation image data sets. The computationally costly learning step is carried out offline in advance. A proper model is then afterwards utilized in the proposed invention potentially in the image selection process an in the parameter optimization step.

There are a number of evolutionary optimization algorithms, which are particularly useful with respect to the present invention. Examples of such preferred optimization algorithms are an evolutionary algorithm with covariance matrix adaptation, a non-dominated sorting based evolutionary algorithm, and S-metric selection evolutionary multi-objective algorithm, and/or a reference vector guided evolutionary algorithm.

According to the invention, he set of templates is defined by a set of preferences for the adaptation of visuals. The set of preferences may be preferred user preferences for settings for brightness, contrast, color saturation, and/or lighting. According to a particularly preferred embodiment, the set of preferences are provided by a machine learning algorithm trained on categories of images from databases or movies. Thus, even without interaction of a user during use of the system an improvement of the preferences as possible. Advantageously said set of preferences are settings for a triangulated mesh of said vehicle which is rendered using a computational texture of the vehicle, and integrating said rendered vehicle into said optimized visual. This approach enables to generate some kind of vehicle selfie, even although the camera is firmly mounted on the vehicle. Thus, by rendering the vehicle using a computational texture of the vehicle, the vehicle can be added to the image which has already been improved.

Such triangulated mesh, which is used to insert an image of the vehicle into the enhanced visual can advantageously be provided by the vehicle maker. The triangulated mesh is then stored in the system and is available for integration into an enhanced visual before the visual is finalized. Additionally, and further preferred, the computational texture can also be provided by the vehicle maker and be stored in the system for executing the method.

Furthermore, it is advantages if based on the published visuals feedback by the community is given and that the criteria of appeal are adapted in response to such feedback to a published final visual.

BRIEF DESCRIPTION OF THE DRAWINGS

In the following a preferred example will be explained that illustrates advantages and aspects of the inventive method. The example will be explained based on the drawings in which.

DETAILED DESCRIPTION

Figure 1:
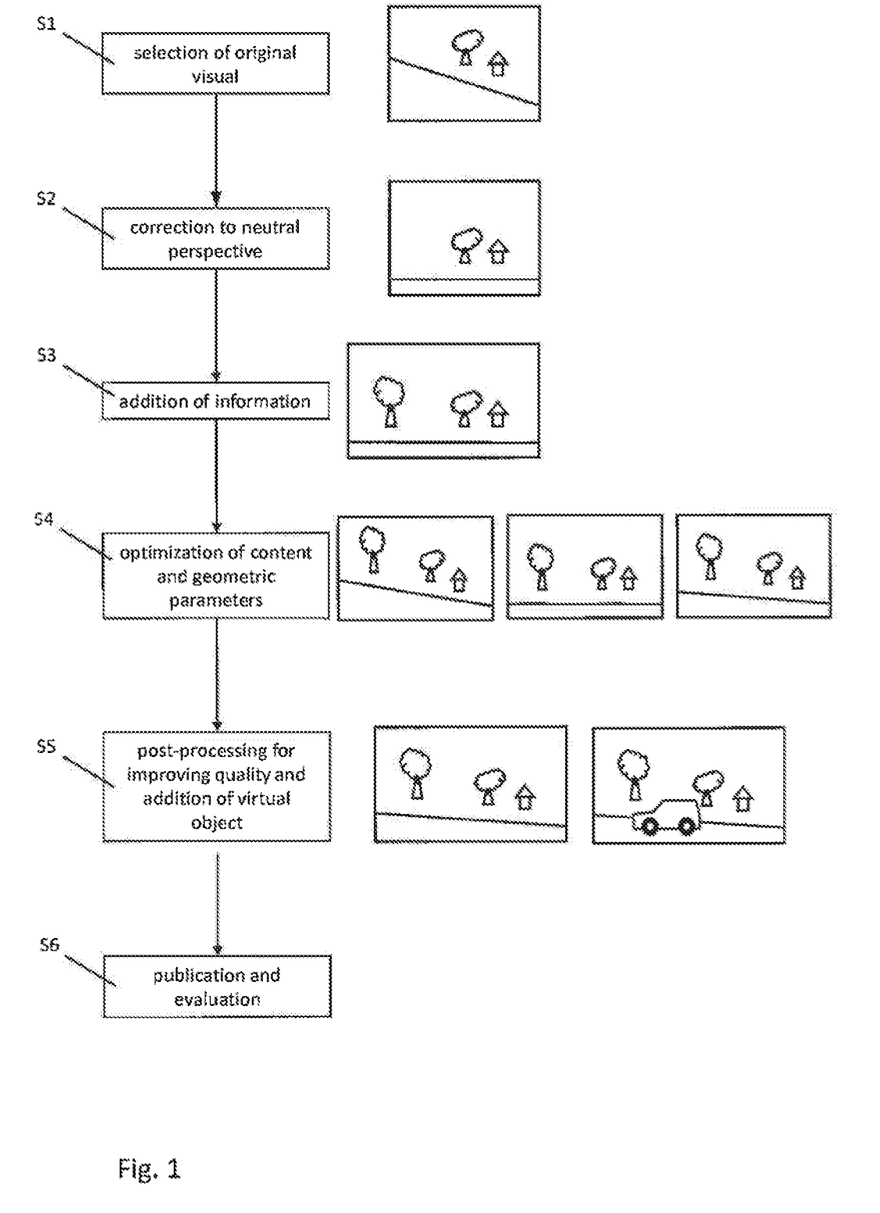
FIG. 1 shows a flowchart of the method according to a preferred embodiment of the invention.

In FIG. 1, next to the flowchart showing the method with each process step there is shown a series of pictograms visualizing the effect on the original visual.

At first, an original visual needs to be determined based on which the present invention is executed. One easy way to determine such original visual is capturing a visual based on the user operating a pushbutton of the camera. Of course, since the camera is mounted on the vehicle the pushbutton does not need to be directly arranged on the camera itself but may be any operational element of the vehicle causing the camera to take an image. Of course, in order not to distract the driver and, thus, maintaining his full attention to the traffic, it is preferred that a trigger event is used to cause the camera to capture and record the visual. It is to be noted that for the purpose of the present application and explanation of the preferred embodiments no distinction is made between "visual" and "image". Of course, visuals in general may include not only still images but also video. However, from the explanation it is fully understandable that all information, which is given to the still image may in the very same way also be applied to videos.

Recording the image may be triggered by a number of different triggers events such as the geolocation of the vehicle, which might be measured by the Global Navigation Satellite System (GNSS) which is utilized to access map data for identifying spots of interest. Alternatively, the local time may be used which could be used to take an image at time where the user expects an event to occur. The time may be set by the user in advance and when this time is reached the system will automatically capture the image for further processing. In addition, internal events of the vehicle may be used to trigger capturing and recording of an image, for example, acceleration sensors detecting strong acceleration or breaking events. As a further example, audio events may be mentioned which could be internal audio events, like spoken words by a human or a radio voice in the vehicle, but also external audio events like sounds of the traffic infrastructure or other traffic participants. These entire trigger events have in common that a single image or a single video is captured at a point in time, which is defined by the trigger event. On the other hand, the cameras that are mounted on the vehicle are regularly intended for continuous recording of visuals. Thus, there is an opportunity to analyze the visuals as often as wanted, because they are all stored in a memory. Such an analysis may reveal interesting content and as soon as such interesting content is identified within a visual, processing of this particular visual determined as an original visual can be started.

It is in particular advantageous even in case that a dedicated original visual is captured and recorded based on occurrence of a trigger event that the processing of the original visual using all the computational algorithms which are explained in greater detail below is performed as soon as computational resources are available. Thus, it is possible to use off-line processing which significantly reduces the requirements for the processor of the vehicle. If the original visual is selected from a series of continuously recorded visuals the visual can be taken from a video stream or from the camera directly. An evaluation is performed using semantic video and image annotation algorithms. Such automatic annotation algorithms per se are known in the art. After the images have been annotated, the annotation is computed to result in an interestingness score. Such interestingness score is calculated based on certain criteria, which have been specified by a user beforehand. Thus, the interestingness score is a value defining how far the annotated visual fulfills these criteria. The better the annotations fulfill the criteria, the higher the value of the interestingness score is. Of course, a plurality of different criteria may be combined. It is also possible to automatically optimize over vehicle lifetime the criteria so that starting from, for example, an original definition of the criteria by a human user, an automatic adaptation is performed based on a feedback system. This feedback system will be described later on and requires publication of the visuals. The criteria defined either directly by a human user or based on a feedback system are provided to the system as so-called traits.

Examples of such criteria are given on one hand by the occurrence of words in the annotation, for example specifying a color (e.g. "red"), a name ("Golden gate Bridge"), animals ("dog"), relations between image contents ("A is next to B"), words dominating today's news, and so on, and on the other hand by features of the annotation sentences, for example, the number of words becomes larger than the specified threshold, or the number of occurrences of the same word in an annotation. The interestingness score can be a value, which is incremented for each fulfilled single criterion. Of course, other schemes are also possible. The interestingness score in any case is a measure how close the visual in its current configuration is to an image considered to be most interesting. A visuals fulfilling the criterion regarding its interestingness score is then selected as original visual. This automatically selected visual, or specifically captured image, is then processed in further steps.

The next step S2, after determining an original image to be processed is correction of the original image regarding its perspective for seamless information fusion. A distortion that might be present in the original image may, on the one hand, be caused by a perspective of the camera when capturing the image, or by physical characteristics of the capturing camera itself. Of course, even a combination of both sources of distortion may occur. These distortions are then rectified in the next step S2. Such kind of neutralization of the image ensures that the addition of information, which will be described later on can be seamlessly performed.

Before the core aspects of optimizing the quality of the visual are explained, the general stages of performing the optimization shall be explained. There are two different aspects regarding the optimization of quality of a visual. First, the interestingness of the visual is optimized and thereafter the technical quality of the visual is optimized. Interestingness may comprise aspects such as objects that are shown in the image, perspective, height, width, etc. All these parameters concern the composition of the visual. On the other side, the technical quality regards aspects like color saturation, brightness, contrast and so on.

Before the technical quality of the image is improved, at first it is ensured that the interestingness of the visual is optimized. It is to be noted that this interestingness is independent from the interestingness value which was already used above in order to select one particular visual from a series of continuously recorded visuals to be one original visual for further processing. Of course, specific individual criteria of the interestingness may be the same as in the process of selecting a specific visual. The interestingness, which is now optimized using an optimization loop comprises the addition of information taken from other visuals but also modification of the perspective by angle correction as well as angle and focus adaptation. Thus, by improving characteristics and features concerning a composition of a visual an enhanced visual is generated. For this enhanced visual and automatic semantic image and/or a video annotation is performed again. Thus, the annotations now generated correspond to the enhanced visual. These annotations are then evaluated so that an interestingness value according to the specified traits can be obtained. These traits are all directed to aspects of artistic representation (composition) of the visual. After the contents, perspective and the like have been optimized in this stage of the overall optimization of the visual, finally the technical quality of the resulting images improved. This will be shown later on with respect to the example.

After having neutralized the original visual information taken from other images can be added. In the flowchart this is denoted with reference S3. Such addition of information or information fusion can result in adding, for example, a tree as it is shown in the pictogram next to method step S3. This is an example for addition of a single object to an image. The addition of information can add entire object as it is shown in the figure but also details of an object which is already included in the original visual may be improved, e.g., texture. As shown in the illustrated example, the addition may of course include addition of entire regions, which had not been captured by the original visual. It is particularly useful to use images for the addition of information into the original visual that were captured using a stereo camera. In such a case depth information is included in the stereo image and therefore a three-dimensional model of the environment may be computed. Such three-dimensional modeling allows to change the perspective in a wider range. Since all the relative distances between the objects in the image are known, an artificial image may be generated from arbitrarily selected point of view.

The information that is added to the original visual may be taken from any sources that are available. The system uses, for example, one or more databases, which are available via the internet or any other communication channel. To make such databases available, the system is equipped with a communication unit for accessing the internet. But also privately hosted servers, in particular privately hosted servers that are owned by the vehicle owner as well can be used. Thus, if, for example, the vehicle owner wants to generate a high quality visual of some specific location, like, for example, the gate Golden Gate Bridge, he may use a plurality of images all captured by his own camera but at different points in time and maybe from slightly different locations. He collects these images on his private server and the vehicle is capable to excess his private server and search for visuals that are similar to the one just captured. Any of these databases may be supplied with visuals taken by other traffic participants like cars, people, etc. But also images that have been taken from stationary cameras may be used. These stationary cameras may be part of the infrastructure of a smart city and also be connected to a publicly available database or provide its own database. Of course, the vehicle owner can already make precomputations based on the image material collected from the entirety of vehicles. Furthermore, data privacy is carefully taken care according to regulations.

In order to select, in a first step, images that could be used for providing information to be added to the visual, a similarity search may be performed on the entirety of visuals stored in the databases. After a set of images has been found having a specific amount of similarity with the original image, the information to be added to the original visual is selected. Then, information taken from this additionally selected image may be used for fusion with the original visual. The similarity search starts from the neutralized original visual and selects, for example, a variety of visuals containing the same or at least similar content like for example the Golden gate Bridge. Instead of only carrying out a similarity search also partial search of the neutralized original image might be selected. In the present case, for example, that is shown in FIG. 3 a tree is added which looks similar to the one already included in the original visual. The addition of information is carried out by executing a stitching algorithm. The resulting visual is called enhanced visual.

For the optimization of the composition or the artistic representation, parameters of the visual like height, width, vanishing point, perspective angle etc., are encoded and optimized in step S4. Also, the addition of objects, like the tree in the example may be encoded. In each optimization step, the parameters are varied according to the chosen optimization algorithm. Examples for preferred optimization algorithms are deterministic or stochastic optimization algorithms. The artistic representation parameters or composition parameters may comprise also the objects that are included in the visual. Three examples denoted as visual A, visual B, and visual C are illustrated in FIG. 1. The optimization of the parameters of the enhanced image is performed in accordance with traits that might, for example, define the presence of two trees and one house along a road having an inclination of 10°. As it can easily be seen from visual C, here all these criteria are fulfilled. As a result of the automated annotation, comparison of the annotation results with the criteria defined as traits, it is immediately clear that visual C has the highest degree of accordance with the traits. Thus, the visual C may be given a score of, for example, 10. Contrary, visual B has the lowest degree of accordance with the traits and thus the score is only 3. In visual B the annotation that is automatically performed says two trees and a house along the road. On the other side, visual A has an annotation that says two trees and a house along a 20°-inclined road. Since here the road is also inclined the score is higher than for visual B but nevertheless it does not meet perfectly the requirements defined in the traits. For each match of an annotation with a trait a counter could be incremented. Different traits might have different importance and, thus, a plurality of separate counters using different increments could be used. In the end, all counter values are added to give an overall interestingness value. Alternatively, a single counter with adapted increments depending on the specific trait could be used.

At the end of the optimization loop of step S4, a parameter set is determined that results in a visual C having a composition which, thus, is the best result regarding geometric parameters and content of the visual. This visual is then selected and in a further method step S5 post-processing is performed on this selected enhanced image with applied selected parameters. In the post-processing step S5 the optimal parameter set is applied on the corrected enhanced visual and an improvement is performed using predefined templates. By using such predefined templates the technical quality of the images improved. The post-processing may either use specified values for brightness, contrast, color saturation, focus effects, filter effects etc., but also the image parameters may be defined using machine learning algorithms which have been trained on image or video categories, e.g., all images of Disney movies, animal movies etc.

Post-processing is directed to the technical quality of the resulting visuals but another aspect can be the addition of a virtual object (or a plurality of virtual objects) into the visual. Thus, an alternative template utilizes the shape of the car, which initiated the recording of the visual. Such car may be positioned on the optimized visual achieved up to this stage. This is achieved by using a computational triangular mesh, e.g., stereolithography (STL) file representing the shape of the vehicle which recorded the original visual, which is textured using either an existing texture which is as close as possible to the appearance of the vehicle which recorded the initial visual, or texture extracted from visuals taken by the traffic infrastructure or other traffic participants connected to the infrastructure of the Smart city environment at a time close to the time when the original visual has been recorded. By rendering an image section using the triangular mesh but also one of the textures utilizing the optimal parameter set the vehicle can be included in the final image. This image section may be modified in the very same way as explained above and improved with pre-specified settings, e.g., specified values for brightness, contrast, saturation, focus effects, filter effects, etc. In FIG. 1 this is illustrated by showing visual $C^A$ and visual $C^B$. Visual $C^A$ is only improved by applying specified values for brightness, contrast and so on whereas visual $C^B$ also includes the vehicle itself to generate some kind of selfie of the vehicle in front of objects that are actually the sum of objects captured by taking an image but also extracted objects from other visuals.

Of course, it is not necessary to include an image section into the enhanced image, but this is one further way of generating an appealing image starting from an original visual taken by a camera mounted on the vehicle. With the two-step improvement that was carried out on the original visual (namely the improvement of the interestingness followed by improvement of the technical quality) a final visual is generated. This final visual may then be output to be published so that an evaluation can be performed by users who actively communicate their feedback but also by a machine learning algorithm that creates a likeness score. This is indicated by method step S6. This likeness score is utilized to compute for each trait a likeness score by assigning each trait which has been used in the optimization of the evaluated visual for each likeness accounting event. This is done for a plurality of final visuals and these visuals sometimes use the same traits. Thus, from the feedback given to a plurality of different visuals covering a plurality of trait combination, an analysis can be performed. Eventually the traits of the system are adapted by, e.g., removing traits with low likeness scores and adding of new traits randomly, based on machine learning algorithms for user preference.

Figure 2:
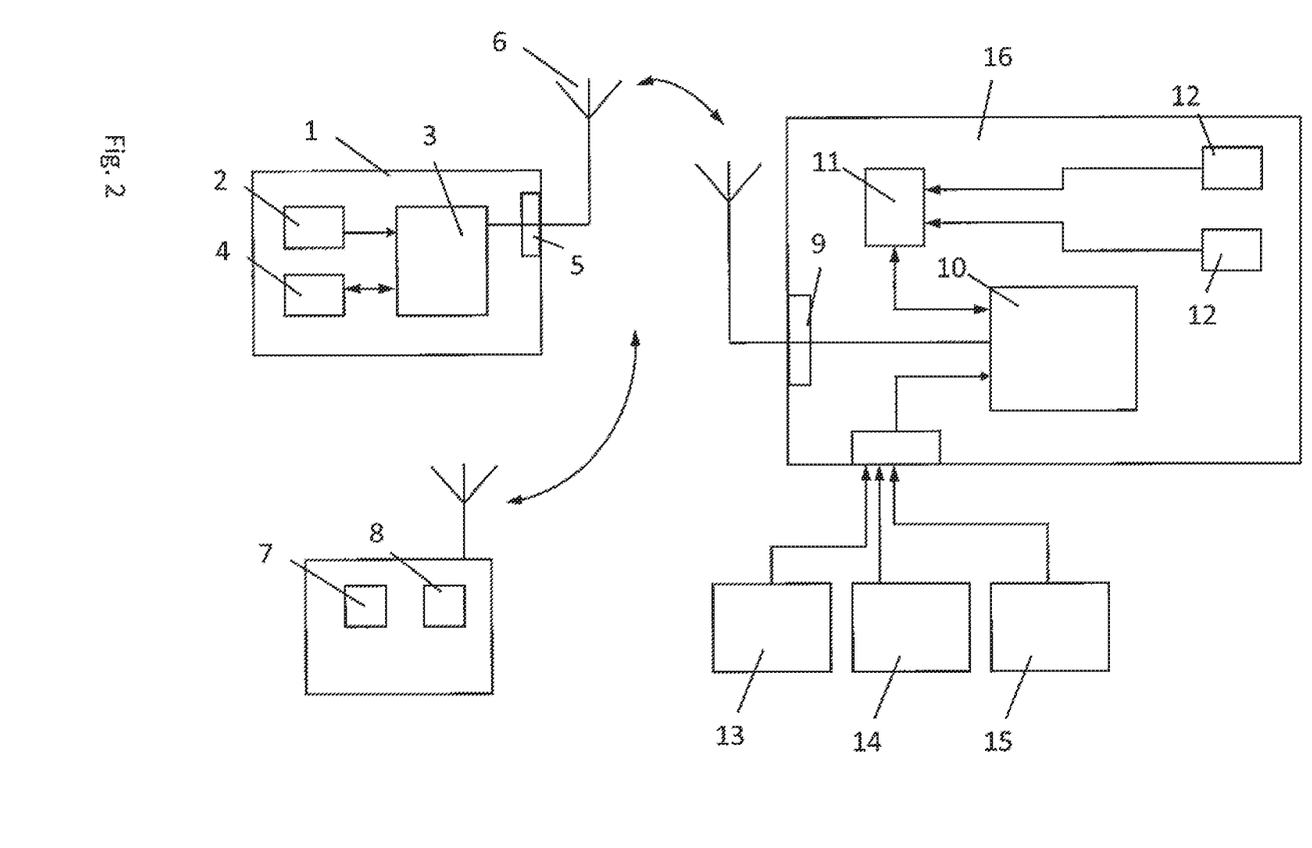
FIG. 2 is a schematic of the layout of the entire system for performing the method.

In FIG. 2 there is shown a simplified schematic of the entire system used for carrying out the method steps according to the present invention. The system comprises in particular one vehicle 1 including the camera 2, which is connected to the processor 3. The processor 3 is connected to a memory 4 so that images that are taken by the camera 2 can be stored in the memory 4. The processor 3 is further capable of communicating with communication counterparts by means of communication modules 5 such as an LTE interface connected to an external antenna 6.

The communication counterpart may on the one side be the Internet in general, which is exemplary illustrated having two databases 7 and 8, one of them being a public database and the other one a privately hosted database. On the other side, the communication counterpart may also be an infrastructure 16 of a so-called smart city. Such infrastructure 8 may comprise also the communication unit 9 so that data can be exchanged between the vehicle 1 and the infrastructure 16 of the smart city. The communication interface 9 is connected to a processor 10, which in turn is connected to a memory 11. The infrastructure 16 may also be may also comprise one or more stationary cameras 12 which might either at regular intervals or upon being triggered take visuals from the environment and store the visuals in the memory 11. These visuals may then be used for addition of information to the original image captured by the camera 2 of the vehicle 1. Additionally the infrastructure 16 may be connected to other vehicles 14, 15 and 16, which are themselves equipped with further cameras and which can transmit their image data also to the memory 11 of the infrastructure 16.

It is to be noted that in the explained embodiment the processor 3 that performs all the optimization and improvement of the original visual is arranged in the vehicle 1. But it is of course also possible to use an off-line processing so that another processor may be used having even better performance than the one included in the vehicle 1. In that case, the vehicle communicates not only with the infrastructure 16 and the databases of the internet but also, preferably via the internet, with a PC, for example, of the vehicle owner.

The invention claimed is:

1. Method for automatically generating an improved visual based on an original visual captured by a vehicle mounted camera, comprising:
    capturing and recording an original visual by the vehicle mounted camera;
    performing an optimization process that improves content and technical quality of the original visual by making it more similar to a set of predetermined traits by
    adding information to the original visual to generate an enhanced visual by adapting content from further visuals, wherein the further visuals are captured by other sensors or created based on information from other sensors or from a database of visuals;
    adapting iteratively a geometric parameter set of the enhanced visual to generate a certain perspective or morphing to improve an arrangement of semantics in the enhanced visual;
    applying the adapted parameter set to the enhanced visual to generate a final visual; and
    outputting the final visual for immediate or later use,
        wherein performing the optimization process comprises optimizing the geometric parameter set of the enhanced visual to generate an optimized parameter set, and includes adding information to the original visual that is additional semantic content,
        and
        encoding the geometric parameter set in an optimization algorithm,
        iteratively adapting the encoded parameter set to generate an adapted parameter set and applying each adapted parameter set to the enhanced visual to generate resulting enhanced visuals,
        applying a method for automated semantic annotation on the resulting enhanced visuals from applying the adapted parameter set for generating an annotation, and
        calculating similarity of the generated annotation towards a set of traits.

2. The method according to claim 1, said method further comprising:
    rectifying distortion that was generated by a perspective of the camera when capturing the original visual or that results directly from camera parameters to generate the rectified visual.

3. The method according to claim 1, said method further comprising
    computing the semantic image content and its arrangement in the original visual.

4. The method according to claim 1, said method further comprising
    conducting post-processing on the enhanced visual after applying the adapted parameter set using a set of templates to generate the final visual.

5. The method according to claim 1, wherein
    capturing of the original visual is triggered by an event and the event is one of the group of reaching a set local time, occurrence of defined sensor anomalies and occurrence of audio events.

6. The method according to claim 1, wherein
    the visuals are captured and recorded continuously,
    the captured and recorded visuals are each provided with a semantic annotation using a method for automated semantic annotation of the continuously captured and recorded visuals; and the original visual is selected from the captured and recorded visuals based on a similarity of the semantic annotation with the set of traits.

7. The method according to claim 6, wherein said traits are specific words, categories prepositions, number of words or similarity of words.

8. The method according to claim 7, wherein said calculation of the similarity is computed as a sum of single traits.

9. The method according to claim 4, wherein in the post-processing step at least one of lighting, brightness, color saturation and white balance are adjusted.

10. The method according to claim 1, wherein the added information is extracted from the at least one visual stored in internet databases or privately hosted databases and retrieval is computed by similarity of the at least one visual to the rectified visual.

11. The method according to claim 10, wherein the added information is extracted from the at least one visual captured and recorded by another source and that this capturing is actively triggered in response to capturing the original visual.

12. The method according to claim 1, wherein the optimization is executed using an evolutionary optimization algorithm.

13. The method according to claim 12, wherein said evolutionary optimization algorithm is an evolutionary algorithm with covariance matrix adaptation, a non-dominated sorting-based evolutionary algorithm, an S-metric selection evolutionary multi-objective algorithm, or a reference vector guided evolutionary algorithm.

14. The method according to claim 4, wherein the set of templates is defined by a set of preferences for an adaptation of visuals, and the set of preferences are user preferences for settings for brightness, contrast, color saturation or lighting.

15. The method according to claim 4, wherein the set of templates is defined by a set of preferences for an adaptation of visuals, and the set of preferences are provided by a machine learning algorithm trained on categories of images from databases or movies.

16. The method according to claim 4, wherein the set of templates is defined by a set of preferences for an adaptation of visuals, and the set of preferences are settings for a triangulated mesh of said vehicle which is rendered using a computational texture of the vehicle, and integrating said rendered vehicle into said final visual.

17. The method according to claim 16, wherein the triangulated mesh is provided by a vehicle maker and stored in a system for executing the method.

18. The method according to claim 17, wherein the computational texture is provided by the vehicle maker and stored in the system for executing the method.

19. The method according to claim 16, wherein the computational texture is computed based on data provided by a traffic infrastructure.

20. The method according to claim 1, wherein criteria of appeal are adapted to a received feedback to a published final visual.

21. System including a vehicle on which a camera is mounted, the camera being configured to capture and record an original visual, the system further comprising a processor configured to execute the method steps as defined in claim 1 based on the original visual.

* * * * *